United States Patent [19]

Goto et al.

[11] 4,004,090
[45] Jan. 18, 1977

[54] BIT SYNCHRONIZATION CIRCUIT

[75] Inventors: Akio Goto, Hachioji; Shigenori Okamoto, Tama; Shigeru Asakawa, Fujisawa; Fumio Sugiyama, Yokohama, all of Japan

[73] Assignee: Tokyo Shibaura Electric Co., Ltd., Tokyo, Japan

[22] Filed: Jan. 23, 1976

[21] Appl. No.: 651,778

[30] Foreign Application Priority Data

Jan. 24, 1975 Japan .............................. 49-10343

[52] U.S. Cl. .............................. 178/69.1; 328/138
[51] Int. Cl.² ........................................... H04L 7/00
[58] Field of Search .............. 178/69.5 R; 328/138, 328/151; 325/55, 64, 58; 179/15 BA, 15 BS

[56] References Cited

UNITED STATES PATENTS

| | | | |
|---|---|---|---|
| 3,549,804 | 12/1970 | Greenspan | 178/69.5 R |
| 3,699,261 | 10/1972 | Tomozawa | 178/69.5 R |
| 3,836,726 | 9/1974 | Wells | 325/55 |
| 3,851,251 | 11/1974 | Wigner | 179/15 BA |
| 3,894,185 | 7/1975 | Vieri | 179/15 BS |
| 3,941,930 | 3/1976 | Mohri | 178/69.5 R |

Primary Examiner—Robert L. Griffin
Assistant Examiner—Michael A. Masinick
Attorney, Agent, or Firm—Cushman, Darby & Cushman

[57] ABSTRACT

A bit synchronization circuit which comprises a pulse generator for producing a pulse corresponding to a data signal received; a clock pulse oscillator for supplying a clock pulse having a frequency as high as four times the data speed of said data signal; a synchronization-controlling circuit supplied with signals from said pulse generator and clock pulse oscillator to produce a signal with a prescribed phase relative to a pulse delivered from said pulse generator; a ring counter whose reset terminal is supplied with an output signal from said synchronization-controlling circuit and whose count terminal is impressed with a clock pulse produced from said clock pulse oscillator; and a flip-flop circuit whose set terminal is supplied with the content "0" of said ring counter and whose reset terminal receives the content "2" thereof, thereby generating an output pulse synchronous with said data signal received.

4 Claims, 31 Drawing Figures

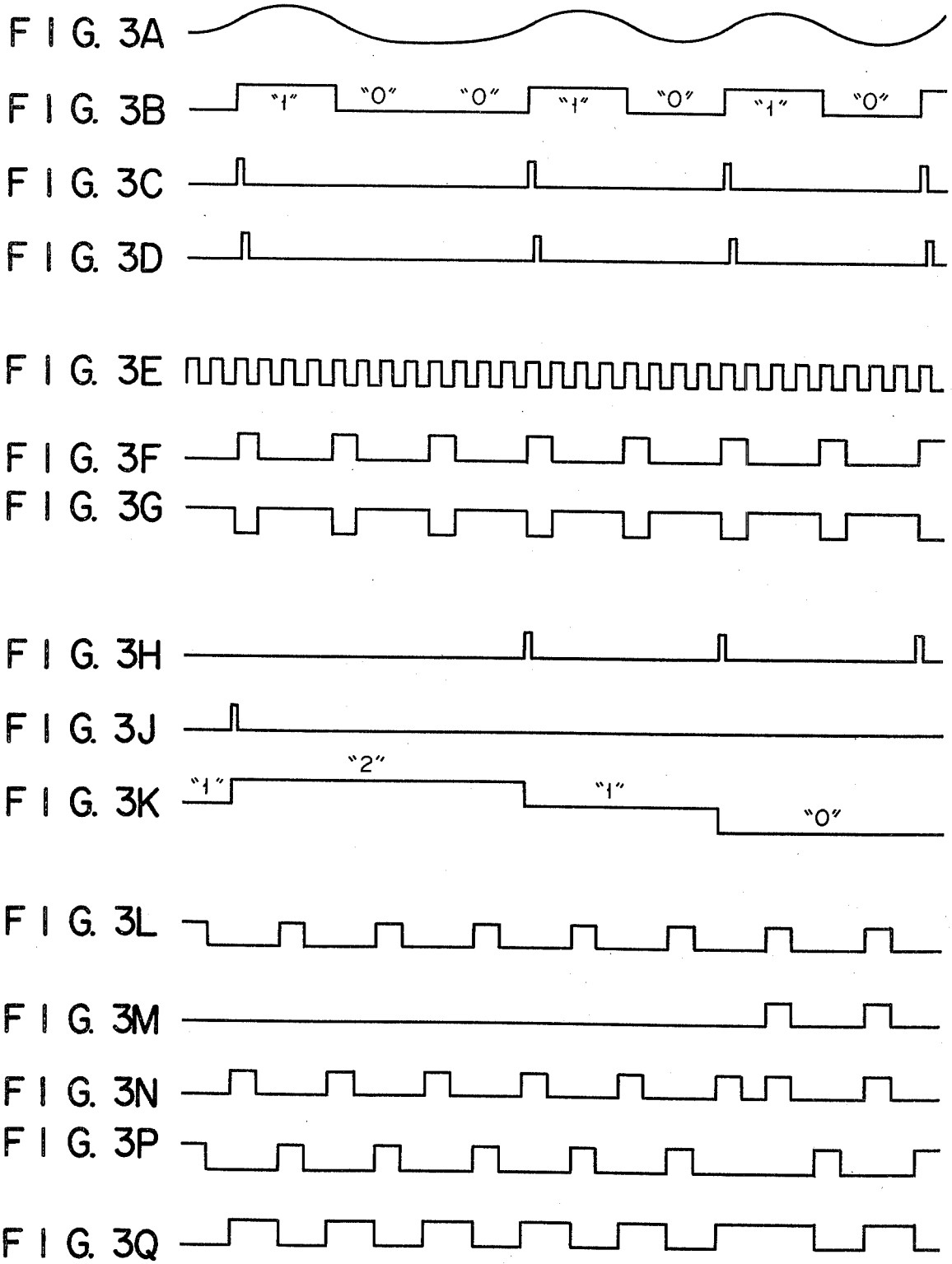

BIT SYNCHRONIZATION CIRCUIT

BACKGROUND OF THE INVENTION

This invention relates to a bit synchronization circuit. Where a digital communication method is adapted in vehicle communication, for example, a radio paging system, it is important to maintain a synchronization relationship between a transmitter and receiver.

A portable paging receiver carried by a subscriber is not always set in a suitable place for reception, but is sometimes located at the position in which the strength of an electric field received in the portable paging receiver is considerably weakened, for example, by obstacles or standing waves appearing between the portable paging receiver and transmitter. The frequent occurrence of an asynchronous condition between the transmitter and receiver due to intervening obstacles or standing waves, etc. leads to a failure to establish satisfactory communication. Therefore, demand has been made for development of a bit synchronization circuit which, even under adverse conditions, sustains synchronization between the transmitter and receiver and can quickly pull in, that is, restore any asynchronous condition to a synchronous state.

The prior art bit synchronization circuit is classified into a slave type and an independent type. The slave synchronization circuit uses a clock pulse extracted from an input signal by means of a tank circuit or phase-lock loop. The independent synchronization circuit is supplied with an output from a clock pulse oscillator installed in a receiver.

Both types of synchronization circuit are applied to a communication device provided with, for example, a battery-saving system. The numerous receivers of the battery-saving type communication device are divided into an $n$ number of groups. A transmitter repeatedly produces calling signals for the respective groups in series. Receivers belonging to a specified group carry out normal reception while a calling signal for said group is being produced. During the other period, power supply to a radio signal receiver is suspended, thereby saving power consumption.

With the above-mentioned battery-saving type communication device, the radio signal receiver has to be intermittently supplied with power in accordance with a prescribed timing format, even when the supply of a data signal is suspended for long. Where power is intermittently supplied at a different time interval from the prescribed timing format or only for an unduly short length of time, then the radio signal receiver ceases to receive a calling signal.

Where a synchronization circuit is applied to a battery-saving type communication device, the independent synchronization circuit has the following advantages over the slave synchronization circuit: (1) the clock pulse oscillator is operated under stable condition, preventing the occurrence of an asynchronous condition even when a data signal is not supplied for long; (2) time for pull-in is short; and (3) power consumption is small.

However, a bit synchronization circuit used with the prior art independent synchronization system has the drawback that the bit synchronization circuit is liable to be adversely affected, for example, by noises.

There will now be described by reference to FIG. 1 the prior art bit synchronization circuit. A high speed clock pulse oscillator 11 gives forth a high speed clock pulse having a frequency $4f$ about four times a data rate $f$. The high speed clock pulse is supplied to the count terminal of a 4-scale ring counter 12 to be counted thereby. The contents of 0 to 3 are shifted in the 4-scale ring counter 12 in the order mentioned.

When the content indicates 0 or 2, the 4-scale ring counter 12 generates an output. When receiving an output denoting the content 0 from the 4-scale ring counter 12 at the reset terminal and an output denoting the content 2 from said counter 12 at the set terminal, then a flip-flop circuit 13 produces a clock pulse.

A digital signal (data rate $f$) of a base band which has been received and demodulated is conducted to a wave-shaping circuit 14 for correction of the distortion to which the digital signal was subjected during transmission. An output from the wave-shaping circuit 14 is carried to a differential circuit 15 for differentiation. This differential circuit 15 produces a pulse at the point of time at which an output from the wave-shaping circuit 14 has its level shifted, that is, at the rise or fall of said output. An output pulse thus generated is conducted to the reset terminal of the ring counter 12 to reset it.

Even where, with the synchronization circuit of FIG. 1, an input signal to the wave-shaping circuit 14 and an output signal therefrom denoting the content 2 of the ring counter 12 present different phases due to a difference between the frequencies of an output signal from a transmitter (not shown) and an output clock pulse from the clock pulse oscillator 11, the ring counter 12 is reset at the point of time at which an input signal to the wave-shaping circuit 14 has its level shifted, and consequently the phase of an output clock pulse from the clock pulse oscillator 11 is corrected, thereby attaining synchronization between a transmitter and receiver. Further where an input signal ceases to be supplied to the wave-shaping circuit 14, synchronization is still assured between the transmitter and receiver, so long as an output signal from the transmitter and an output clock pulse oscillator 11 indicate a frequency difference falling within a prescribed range.

Where, however, for example, the intensity of an electric field received in a personal pager becomes weaker with a resultant decline in the signal-noise ratio of an input signal supplied to the personal pager, then the point of time at which the input signal has its level shifted occurs at random due to, for example, jitter. As the result, no direct interrelationship is made between the points of time at which the input signal to the personal pager and the output signal from the transmitter have the levels shifted, preventing the ring counter 12 from being reset at definite points of time and leading to a failure to realize synchronization between a transmitter and receiver. As mentioned above, the prior art bit synchronization circuit has the drawback that the circuit is readily affected by atmospheric radio noises, particularly spike noises arising from automobiles.

SUMMARY OF THE INVENTION

It is accordingly the object of this invention to provide a bit synchronization circuit which is as little affected by noises as possible and sustains synchronization between a transmitter and receiver, even where an input signal ceases to be supplied to, for example, a portable paging receiver for a certain length of time, or the signal-noise ratio of said input signal prominently fluctuates.

According to an aspect of this invention, there is provided a bit synchronization circuit which comprises a pulse generator for giving forth a pulse corresponding to a data signal received; a clock pulse oscillator for producing a clock pulse having a frequency as high as an integral multiple of the data speed of said data signal; a synchronization-controlling circuit supplied with signals from said pulse generator and clock pulse oscillator to produce a signal with a prescribed phase relative to a pulse delivered from said pulse generator; a ring counter whose reset terminal is connected to be supplied with an output signal from said synchronization-controlling circuit and whose count terminal is connected to be impressed with a clock pulse produced from said clock pulse oscillator; and a flip-flop circuit, which, when supplied with first and second output signals from the ring counter, produces a pulse synchronous with said data signal received.

BRIEF DESCRIPTION OF THE DRAWING

FIGS. 3A to 3Q present waveforms or signals appearing in various sections of the bit synchronization circuit of FIG. 2 when it is in a satisfactory receiving condition.

DETAILED DESCRIPTION OF THE PREFERRED EMBODIMENTS

There will now be described a bit synchronization circuit embodying this invention by reference to FIGS. 2, 3A to 3Q and 4A to 4P.

Figure 1:
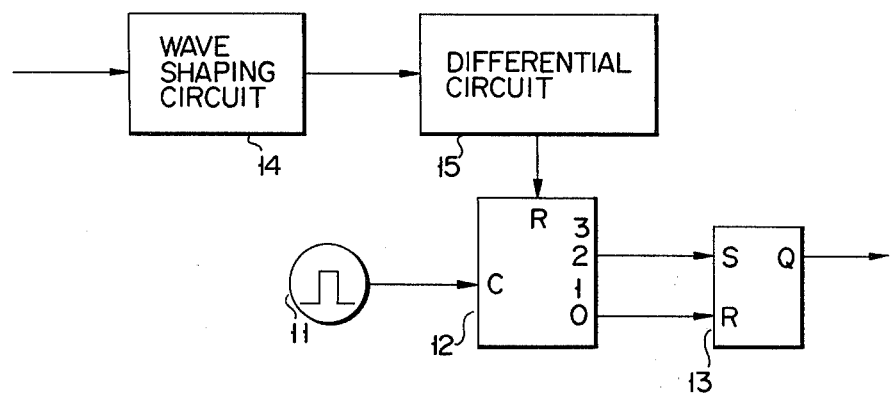
FIG. 1 is a block circuit diagram of the prior art bit synchronization circuit.

The parts of the bit synchronization circuit of this invention the same as those of the prior art bit synchronization circuit of FIG. 1 are denoted by the same numerals, description thereof being omitted.

Figure 2:
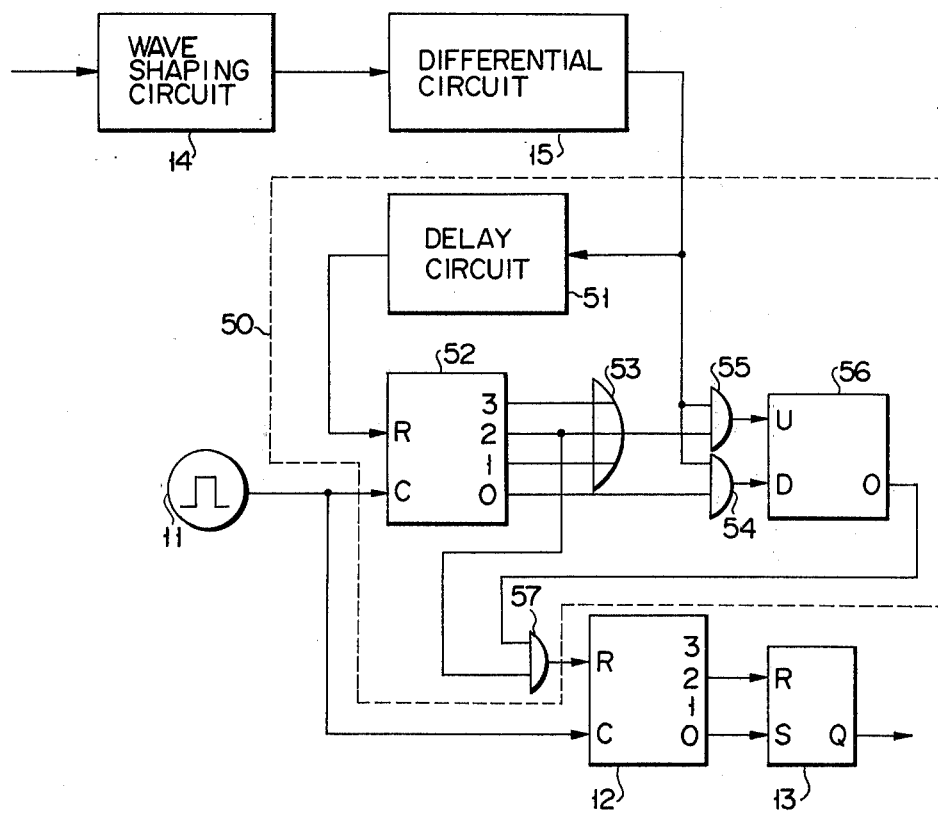
FIG. 2 is a block circuit diagram of a bit synchronization circuit embodying this invention.

The bit synchronization circuit of FIG. 2 is provided with a synchronization-controlling circuit 50, which receives a clock pulse from a clock pulse oscillator 11 and a pulse from a differential circuit 15 and supplies an output signal to the reset terminal of a first 4-scale ring counter 12. The synchronization-controlling circuit 50 comprises a second 4-scale ring counter 52 which counts clock pulses delivered from the clock pulse oscillator 11 to the count terminal of said ring counter 52. An output from the second ring counter 52 corresponding to the content 0 is supplied to the down-count terminal of an updown counter 56 through an AND circuit 54. An output from said second ring counter 52 corresponding to one of the contents 1 to 3 is conducted to the up-count terminal of the updown counter 56 through an OR circuit 53 and AND circuit 55. The gates of the AND circuits 54, 55 are opened by an output pulse from the differential circuit 15 at the point of time at which an input data signal has its level shifted, that is, at the rise or fall of the input data signal. The reset terminal of the second 4-scale ring counter 52 is supplied with an output pulse from the differential circuit 15 through a delay circuit 51.

The updown counter 56 generates an output only when the content indicates 0, causing an AND circuit 57 to be opened. At this time, an output from the second 4-scale ring counter 52 corresponding to the content 2 is sent through the AND circuit 57 to the reset terminal of the first 4-scale ring counter 12 to reset it. The first 4-scale ring counter 12 counts clock pulses produced from the clock pulse oscillator 11. An output from said ring counter 12 corresponding to the content 2 is applied to the reset terminal of a flip-flop circuit 13, and an output from said ring counter 12 corresponding to the content 0 is delivered to the set terminal of said flip-flop circuit 13. At this time, the flip-flop circuit 13 generates an output signal synchronous with an input data signal received.

There will now be first described by reference to FIGS. 3A to 3Q the operation of the bit synchronization circuit of this invention having the above-mentioned arrangement when the circuit is in a satisfactory receiving condition. When a data signal having a waveform illustrated in FIG. 3A is supplied to the wave-shaping circuit 14, then the data signal has its wave shaped thereby into the form of FIG. 3B, and is conducted to the differential circuit 15, which in turn produces a pulse shown in FIG. 3C in response to the rise of the signal received. An output pulse from the differential circuit 15 is delayed by the delay circuit 51 as set forth in FIG. 3D, and thereafter is delivered to the reset terminal of the second 4-scale ring counter 52. The ring counter 52 which has up to this point counted clock pulses (FIG. 3E) from the clock pulse oscillator 11 is reset upon receipt of said delayed output from the delay circuit 51. At this time, the ring counter 52 resumes counting of clock pulses from the clock pulse oscillator 11, starting with the content 0 and gives forth a signal shown in FIG. 3F from the output terminal corresponding to the content 0. An output signal shown in FIG. 3G is produced from the output terminals corresponding to the contents 1 to 3 through an OR circuit 53.

After the above-mentioned operation, the AND circuit 55 generates a pulse of FIG. 3J in response to the initial one of the pulses of FIG. 3C. The AND circuit 54 produces pulses of FIG. 3H in response to the succeeding ones of the pulses of FIG. 3C. Now assume that the updown counter 56 is preset at the content 1. Then an output pulse from the AND circuit 55 causes the updown counter 56 first to carry out up-counting from 1 to 2. Upon receipt of an output pulse from the AND circuit 54, the updown counter 56 carries out down-counting as from 2 to 1 and then from 1 to 0. The updown counter 56 is kept at the content 0 even when a pulse is later supplied to the down-count terminal of the updown counter 56, and consequently continues to produce an output. Where the ring counter 52 produces an output (FIG. 3L) corresponding to the content 2 while the updown counter 56 is supplying an output, then the AND circuit 57 produces an output (FIG. 3M), which in turn is applied to the reset terminal of the 4-scale ring counter 12 to reset it to the content 0. At this time, the counter 12 begins to count clock pulses delivered from the clock pulse oscillator 11, starting with the content 0.

Figure 4A:
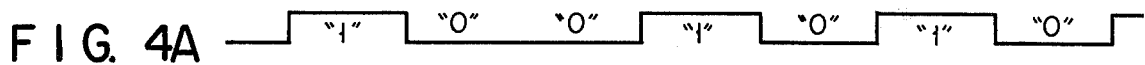
FIGS. 4A to 4P illustrate waveforms of signals appearing in various sections of the bit synchronization circuit when an output clock pulse from a clock pulse oscillator used with said synchronization circuit has its phase shifted from that of a data signal received.
Figure 4B:
Figure 4C:
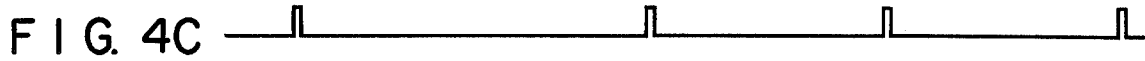
Figure 4D:
Figure 4E:
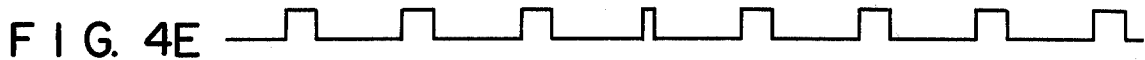
Figure 4F:
Figure 4G:
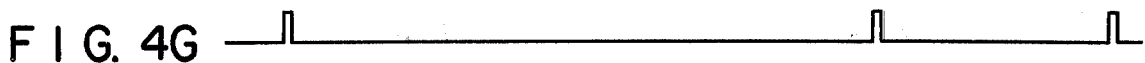
Figure 4H:
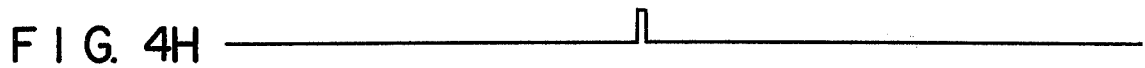
Figure 4J:
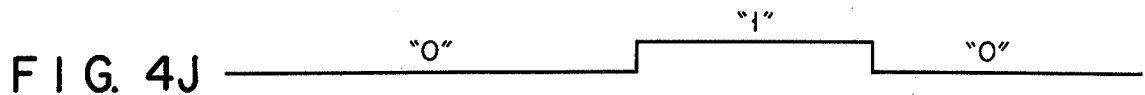
Figure 4K:
Figure 4L:
Figure 4M:
Figure 4N:
Figure 4P:

Outputs from the ring counter 12 corresponding to the contents 0 and 2 respectively have such waveforms as illustrated in FIGS. 3N and 3P. The outputs corresponding to 0 and 2 are carried to the set and reset terminals of the flip-flop circuit 13 respectively. As the result, the flip-flop circuit 13 produces an output (FIG. 3Q) synchronous with the signal of FIG. 3B.

Where the clock pulse oscillator 11 produces clock pulses (FIG. 4D) after the aforesaid condition is sustained for a certain length of time, then a data signal received (FIG. 4A) has its frequency changed. Where, under this condition, a difference takes place between the phase of a pulse (FIG. 4B) from the differential circuit 15 and the phase of an output (FIG. 4E) from the ring counter 52 corresponding to the content 0, then the ring counter 52 gives forth an output (FIG. 4H) corresponding to the content 3 through the AND circuit 55 whose gate is opened by an output pulse from the differential circuit 15. As the result, the updown counter 56 carries out up-counting from 0 to 1 as illustrated in FIG. 4J. The AND circuit 54 which is consequently closed ceases to produce an output, thereby preventing the ring counter 12 from being reset. When, however, the differential circuit 15 generates pulses next time, the ring counter 52 is not reset. Therefore, the updown counter 56 again carries out downcounting to 0, as shown in FIG. 4J, upon receipt of a pulse (FIG. 4G) from the AND circuit 54 and produces an output. The ring counter 12 is reset by an output signal (FIG. 4K) from the ring counter 52 corresponding to the content 2, and again counts up clock pulses from the clock pulse oscillator 11, starting with the content 0. Output signals (FIGS. 4M, 4N) from the ring counter 12 corresponding to the contents 0 and 2 are supplied to the set and reset terminals of the flip-flop circuit 13, which in turn generates an output signal (FIG. 4P) synchronous with the data signal of FIG. 4A.

There will now be described how effectively the bit synchronization circuit of this invention functions even when environmental conditions turn unsuitable for reception. Under each disadvantageous conditions, a data signal received often has its level shifted at an irregular interval due to, for example, jitter. As the result, the ring counter 52, when reset, frequently indicates other contents than 0. Therefore, the updown counter 56 presents a larger content than 0. The AND circuit 57 is not opened, nor is reset the ring counter 12.

The above-mentioned adverse event continues, until environmental conditions prove favorable for reception, that is, until the ring counter 52 still holds the content 0 at the time when a data signal received has its level shifted, and the updown counter 56 commences down-counting to 0. Up to this point, the ring counter 12 has counted clock pulses from the clock pulse oscillator 11 on the basis of interrelationship between the phase of a data signal received and the phase of an output of the flip-flop circuit 13 previously defined before reception is obstructed by external causes, that is, synchronization maintained between both signals. The flip-flop circuit 13 is operated upon receipt of outputs corresponding to the contents 0 and 2, and produces an output substantially synchronous with a data signal received.

If, in case external conditions are improved for reception, spike noises should arise at a different point of time from that at which a data signal received has its level shifted, the bit synchronization circuit of this invention has the advantages that the ring counter 12 is not reset, until the updown counter 56 carries out up-counting upon receipt of spike noise and thereafter down-counting upon receipt of a pulse from the differential circuit 15; and the ring counter 12 is substantially saved from the effect of spike noises, and, immediately after the occurrence of spike noises, produces an output in the same phase relationship as before the appearance of spike noises.

The foregoing description refers to the embodiment of this invention, but the invention is not limited thereto. According to said embodiment, the data speed of a data signal received bears a ratio of 1:4 to the frequency of a clock pulse. However, it is possible to cause the clock pulse to have a frequency as high as an integral multiple of the data speed of the data signal received, and vary the contents of the ring counters 12, 52 and updown counter 56 according to the ratio denoting an integral multiple. Further, with the embodiment of this invention, the updown counter 56 is designed to carry out up- and down-counting at the same rate, that is, counts up by one, each time the up-count terminal is supplied with one pulse and counts down by one each time the down-count terminal receives one pulse. Where, however, up-counting is effected at a larger rate than down-counting, then it is possible to decrease the possibility of the subject synchronization circuit committing an erroneous pull-in.

There will now be described a case in point. Assume that two adjacent pulses from the differential circuit 15 are respectively delayed from a prescribed point of time. Then the first delayed pulse causes the updown counter 56 to carry out up-counting and the second delayed pulse causes the counter 56 to make down-counting. If, in this case, the updown counter 56 should be designed to effect up- and down-counting at the same rate, then the second delayed pulse would bring the updown counter 56 back to the content 0, and some normal pulses would be produced from the differential circuit 15. As the result, the flip-flop circuit would be operated under the condition of erroneous synchronization until the updown counter 56 regains the content 0 upon receipt of normal pulses. Where, however, the updown counter 56 is chosen to count up by 2, each time the up-count terminal receives one pulse and also to count down by 1, each time the down-count terminal is supplied with one pulse, then a harmful effect by a decline in the signal-noise ratio will be avoided. Namely, where the updown counter 56 carries out up-counting by 2 upon receipt of the first delayed pulse, then the counter 56 is not brought back to the content 0 by the second delayed pulse, but further makes up-counting by 2 upon receipt of the succeeding normal pulse. Therefore, the flip-flop circuit 13 continues to produce a signal having the same phase as that signal synchronous with the data signal received which was previously generated before the appearance of a delayed pulse due to the reduced signal-noise ratio, until the updown counter 56 regains the content 0 upon receipt of normal pulses. Therefore, the effect of the decreased signal-noise ratio on the present clock pulse-controlled synchronization circuit can be minimized.

Since, however, the rate at which the updown counter 56 conducts up- and down-counting is related to the length of time required for the bit synchronization circuit of this invention to carry out pull-in, that is, to restore an asynchronous condition to a synchronous state, it is preferred to determine the rate of up- and down-counting in consideration of various conditions in which a paging receiver provided with said synchronization circuit is applied.

The foregoing description refers to the case where the differential circuit 15 was chosen to produce a pulse in response to the rise of a data signal received. Obviously, the differential circuit 15 can issue a pulse at the fall of said data signal to operate the synchronization-controlling circuit 50. The arrangement well serves the purpose all the same.

What we claim is:

1. A bit synchronization circuit which comprises a pulse generator for producing a pulse in response to a data signal received; a clock pulse oscillator for generating a clock pulse having a frequency which is an integral multiple of the data speed of said data signal; a synchronization-controlling circuit supplied with outputs from said pulse generator and clock pulse oscillator to produce a signal with a specified phase relative to a pulse delivered from said pulse generator; a first ring counter whose reset terminal is supplied with an output from said synchronization-controlling circuit and which issues a first and a second output signal corresponding to the content 0 and any other content than 0 in response to clock pulses from said clock pulse oscillator; and a flip-flop circuit supplied with the first and second outputs from said first ring counter to produce a pulse synchronous with the data signal received.

2. The bit synchronization circuit according to claim 1, wherein the synchronization-controlling circuit comprises a delay circuit supplied with pulses from the pulse generator; a second ring counter whose reset terminal receives an output signal from the delay circuit and which generates an output signal corresponding to the content 0; and an updown counter which carries out down-counting upon receipt of pulses form the pulse generator while the second ring counter is generating an output signal corresponding to the content 0 and performs up-counting upon receipt of pulses from said pulse generator when said second ring counter does not produce an output signal corresponding to the content 0 and which sends forth an output signal when brought to the state of the content 0, and also wherein the first ring counter is reset by an output signal from the second ring counter corresponding to any other specified content than 0 while said updown counter maintains the content 0.

3. The bit synchronization circuit according to claim 2, wherein the pulse generator comprises a wave-shaping circuit supplied with an input data signal and a differential circuit for producing a pulse in response to the rise or fall of an output from said wave-shaping circuit.

4. The bit synchronization circuit according to claim 2, wherein the updown counter carries out up-counting upon receipt of a pulse at the up-count terminal at a larger rate than when making down-counting upon receipt of a pulse at down-count terminal.

* * * * *